(12) United States Patent
Bark et al.

(10) Patent No.: US 7,773,733 B2
(45) Date of Patent: Aug. 10, 2010

(54) SINGLE-TRANSFORMER DIGITAL ISOLATION BARRIER

(75) Inventors: Boris A. Bark, Middletown, NJ (US); Brad L. Grande, Port Murray, NJ (US); Peter Kiss, Basking Ridge, NJ (US); Johannes G. Ransijn, Wyomissing Hills, PA (US); James D. Yoder, Leola, PA (US)

(73) Assignee: Agere Systems Inc., Allentown, PA (US)

( * ) Notice: Subject to any disclaimer, the term of this patent is extended or adjusted under 35 U.S.C. 154(b) by 1092 days.

(21) Appl. No.: 11/159,614

(22) Filed: Jun. 23, 2005

(65) Prior Publication Data

US 2007/0003055 A1   Jan. 4, 2007

(51) Int. Cl.
*H04M 11/00* (2006.01)
(52) U.S. Cl. .................................. 379/93.06
(58) Field of Classification Search ............... 379/402, 379/93.06
See application file for complete search history.

(56) References Cited

U.S. PATENT DOCUMENTS

| | | | |
|---|---|---|---|
| 3,934,099 A | 1/1976 | Elder | 379/405 |
| 5,027,264 A | 6/1991 | DeDoncker et al. | 363/16 |
| 5,504,811 A | 4/1996 | Kiko et al. | |
| 5,768,351 A * | 6/1998 | England | 379/93.37 |
| 5,818,298 A | 10/1998 | Dent et al. | 335/10 |
| 6,225,927 B1 | 5/2001 | Scott et al. | |
| 6,297,755 B2 | 10/2001 | Scott et al. | |
| 6,347,128 B1 | 2/2002 | Ransijn | |
| 6,359,973 B1 | 3/2002 | Rahamim et al. | |
| 6,385,235 B1 | 5/2002 | Scott et al. | |
| 6,392,457 B1 | 5/2002 | Ransijn | |
| 6,404,780 B1 | 6/2002 | Laturell et al. | |
| 6,430,229 B1 | 8/2002 | Scott et al. | |
| 6,519,339 B1 * | 2/2003 | Sacca et al. | 379/412 |
| 6,570,513 B2 | 5/2003 | Scott et al. | |

(Continued)

OTHER PUBLICATIONS

"ISSCC 2001/Session 19/Voiceband, XDSL & Gigabit Ethernet Circuits & Transceivers/19.2" Andrew Krone; Tyson Tuttle; Jeffrey Scott; Jerrell hein; Timothy Dupuis; Navdeep Sooch Silicon Laboratories, Inc., Austin, Texas 2001 IEEE International Solid-State Circuits Conferences 0-7803-6608-5 2001 IEEE.

(Continued)

*Primary Examiner*—Alexander Jamal
(74) *Attorney, Agent, or Firm*—Mendelsohn, Drucker & Associates, P.C.; David L. Cargille; Steve Mendelsohn

(57) ABSTRACT

The invention provides a single digital communication link between system-side and line-side circuitry in a DAA, capable both of carrying data signals and of transferring a substantial amount of power to the line-side circuitry. The invention comprises a system-side interface circuit, a line-side interface circuit, and an isolation barrier including a transformer. Each interface circuit is capable of connection to an upstream communication circuit (either line-side or system-side), from which it may receive data signals to be transmitted across the isolation barrier to the other interface circuit, and to which it may pass data signals received across the isolation barrier from the other interface circuit. The line-side interface circuit may further include a rectifier and a storage device.

18 Claims, 8 Drawing Sheets

U.S. PATENT DOCUMENTS

| | | | |
|---|---|---|---|
| 6,611,553 B1 | 8/2003 | Scott et al. | |
| 6,647,101 B2 | 11/2003 | Rahamim et al. | |
| 6,654,409 B1 | 11/2003 | Scott et al. | |
| 6,674,857 B1 | 1/2004 | Fischer et al. | |
| 6,683,548 B2 | 1/2004 | Scott et al. | |
| 6,731,728 B2 | 5/2004 | Hollenbach et al. | |
| 6,757,381 B1 | 6/2004 | Worley | 379/399.01 |
| 6,778,665 B1 | 8/2004 | Fischer et al. | |
| 7,088,803 B2 | 8/2006 | Rahamim et al. | 379/93.05 |
| 7,295,578 B1 | 11/2007 | Lyle et al. | 370/503 |
| 2001/0031016 A1 | 10/2001 | Seagraves | 375/264 |
| 2003/0086435 A1 | 5/2003 | Cooley et al. | 370/431 |
| 2003/0156672 A1 | 8/2003 | O'Shea et al. | 375/365 |
| 2004/0057511 A1* | 3/2004 | Liu | 375/222 |

OTHER PUBLICATIONS

CX81300-SmartACF-V.92/V.90/V.34/V.32bix Single Chip ACF Modem With CX 20493 SmartDAA and Optional CX 20442 Voice Codec Data Sheet Doc. No. 102260B-Aug. 26, 2003-Conexant.
Global Serial Interface Direct Access Arrangement-Silicon Laboratories-Si3056-Si3018/19 Preliminary REv. 0.71 3/03-Copyright 2003 by Silicon Laboratories.
U.S. Appl. No. 11/159,537, filed Jun. 23, 2005.
U.S. Appl. No. 11/206,314, filed Aug. 17, 2005.

* cited by examiner

SINGLE-TRANSFORMER DIGITAL ISOLATION BARRIER

FIELD OF THE INVENTION

The present invention relates generally to digital communication between two devices separated by an isolation barrier.

BACKGROUND OF THE INVENTION

Regulatory agencies throughout the world have established standards and regulations for connecting subscriber equipment to telephone networks. These regulations are intended to prevent damage to the telephone network and mitigate interference with other equipment also connected to the network. The regulations, however, often present difficult design challenges.

For example, subscriber equipment or data communications equipment, such as a data modem, is generally required to provide for some form of electrical isolation to prevent voltage surges or transients originating from the subscriber equipment from having a deleterious effect on the telephone network. Electrical isolation also addresses potential problems associated with differences in operating voltages between a telephone line and the subscriber equipment. More particularly, telephone line voltages may vary widely across a given network, and often exceed the operating voltage of subscriber equipment. In the United States, 1,500-volt isolation is currently required. In other countries, the prescribed isolation may reach 3,000-4,000 volts.

A number of techniques have been utilized to provide the requisite level of electrical isolation. For example, large analog isolation transformers are often employed to magnetically couple analog signals between a two-wire telephone line and the analog front end of a modem or other circuit while maintaining an appropriate level of electrical isolation. The isolation transformer functions to block potentially harmful DC components, thereby protecting both sides of the data connection.

The isolation transformer is typically part of what is referred to in the modem arts as a data access arrangement (DAA). The term DAA generally refers to circuitry that provides an interface between a public telephone network originating in a central office and a digital data bus of a host system or data terminal equipment. The DAA electrically isolates a modem or similar device from a phone line to control emissions of electromagnetic interference/radio frequency interference (EMI/RFI). In addition to electrical isolation, the DAA often develops a number of signals (e.g., a ring signal) for provision to subscriber equipment. The DAA may receive signals from the phone line through a telephone jack, such as a RJ11C connection as used for standard telephones.

Typically, a number of circuits must derive information from the telephone line, and isolation is often required for each signal communicated to and from the host system. Such circuits may include: transmit and receive circuitry; ring signal detection circuitry; circuitry for switching between voice and data transmissions; circuits for dialing telephone numbers; line current detection circuitry; circuitry for indicating that the equipment is coupled to a functional telephone line; and line disconnection detection circuitry. Conventional DAA designs utilize separate line side circuits and separate signal paths across a high voltage isolation barrier for each function of the DAA. This conventional design requires an undesirably large number of isolation barriers.

A more modern solution to reduce the number of isolation barriers in a DAA is to separate the DAA circuitry into line-side circuitry and system side circuitry. The line-side circuitry includes the analog components required to connect to the telephone line, while the system side circuitry typically includes digital signal processing circuitry and interface circuitry for communicating with the host system. Incoming analog data signal from the telephone line is digitized via an analog-to-digital converter in the line-side circuitry and transmitted across the "digital" isolation barrier to the system side circuitry via a digital bi-directional serial communication link. The digital data signal may then be processed by the digital signal processing circuitry in the system side circuitry. Conversely, digital data signals from the host system may be transmitted via the bi-directional serial communication link through the digital isolation barrier to the line side circuitry, where the digital data signals are converted to analog signals and placed on the telephone line.

A problem that arises in this more modern DAA, however, is that the line-side circuitry must be provided with a separate DC power supply that is isolated from the host system power. Two main approaches to provide an isolated power supply have been proposed. In the first approach, power is transferred from the host system to the line side circuitry via a separate power transformer in the form of a stream of digital pulses. The pulses form an AC signal that may be converted to a DC supply voltage via a rectifier in the line-side circuitry. This approach disadvantageously requires at least two transformers—one to serve as the isolation barrier for the digital data signals, and the other to provide power to the line-side circuitry.

A second approach that has been proposed is to derive power for the line-side circuitry from the telephone line itself. This approach, however, is difficult to implement in practice, because the specifications of the telephone communications systems in certain countries, including Germany and Austria, severely limit the amount of power that a DAA may use from a telephone line. This approach also tends to reduce the distance that the subscriber equipment may be located from the telephone central office, because the voltage drop on the telephone line increases as the distance between the subscriber equipment and the telephone company central office increases.

SUMMARY OF THE INVENTION

The invention provides a single digital communication link between system-side and line-side circuitry in a DAA, capable both of carrying data signals and of transferring sufficient power to operate the line-side circuitry without draining power from the telephone line. The present inventors have recognized that a tremendous amount of power may be transmitted from a system-side interface circuit to a line-side interface circuit using an isolation transformer, and that the cost of using a transformer as the isolation barrier may be greatly reduced by transmitting both data and power over a single isolation transformer. Accordingly, the invention comprises a system-side interface circuit, a line-side interface circuit, and an isolation barrier including a transformer over which both data and power signals may be transmitted. Each interface circuit is capable of connection to an upstream communication circuit (either line-side or system-side), from which it may receive forward-going data signals to be transmitted across the isolation barrier to the other interface circuit, and to which it may pass data signals received across the isolation barrier from the other interface circuit.

Each interface circuit preferably includes a mode switch and a tri-state buffer, which enable the interface circuit to operate in a transmit mode or a receive mode. In transmit mode, the interface circuit passes signals from the respective upstream communication circuit to the isolation barrier. In receive mode, the interface circuit receives, and latches to, signals received across the isolation barrier. In the system-side interface circuit, this latching operation allows the system-side interface circuit to transfer power to the line-side interface circuit, even while the line-side interface circuit is transmitting signals to the system-side interface circuit. Further, in the line-side interface circuit, the latching operation allows the tri-state buffer to serve as a rectifier.

The invention further provides a communication protocol for use in a communication interface including an isolation barrier. A single frame in the communication protocol includes one or more forward data bits; one or more forward control bits; one or more reverse data bits, and one or more reverse control bits, encoded via Manchester encoding such that the flux balance of the isolation barrier is maintained. The communication frame may further include one or more "padding" bits that may be added or removed based on the number of forward and reverse data bits that are in the frame, so that the communication interface may accommodate more than one data throughput rate while retaining a fixed clock rate. The frame may still further include a "sync" pattern comprising three consecutive cycles having the same value.

The invention also provides a method of communicating signals across an isolation barrier in accordance with the above communication protocol.

BRIEF DESCRIPTION OF THE DRAWINGS

Various embodiments of the present invention will now be described in detail in conjunction with the annexed drawings, in which.

DETAILED DESCRIPTION

The present invention provides an isolated digital communication link between line-side circuitry and system-side circuitry in a DAA. In accordance with the invention, a single transformer is employed as the isolation barrier. Using the single-transformer isolation barrier ("STIB"), a sufficiently large amount of power may be transferred from a system-side interface circuit ("SSIC") to operate the line-side interface circuit ("LSIC") without relying on the telephone line as a primary source of power. The STIB may carry bi-directional data, clock and power signals.

Figure 1:
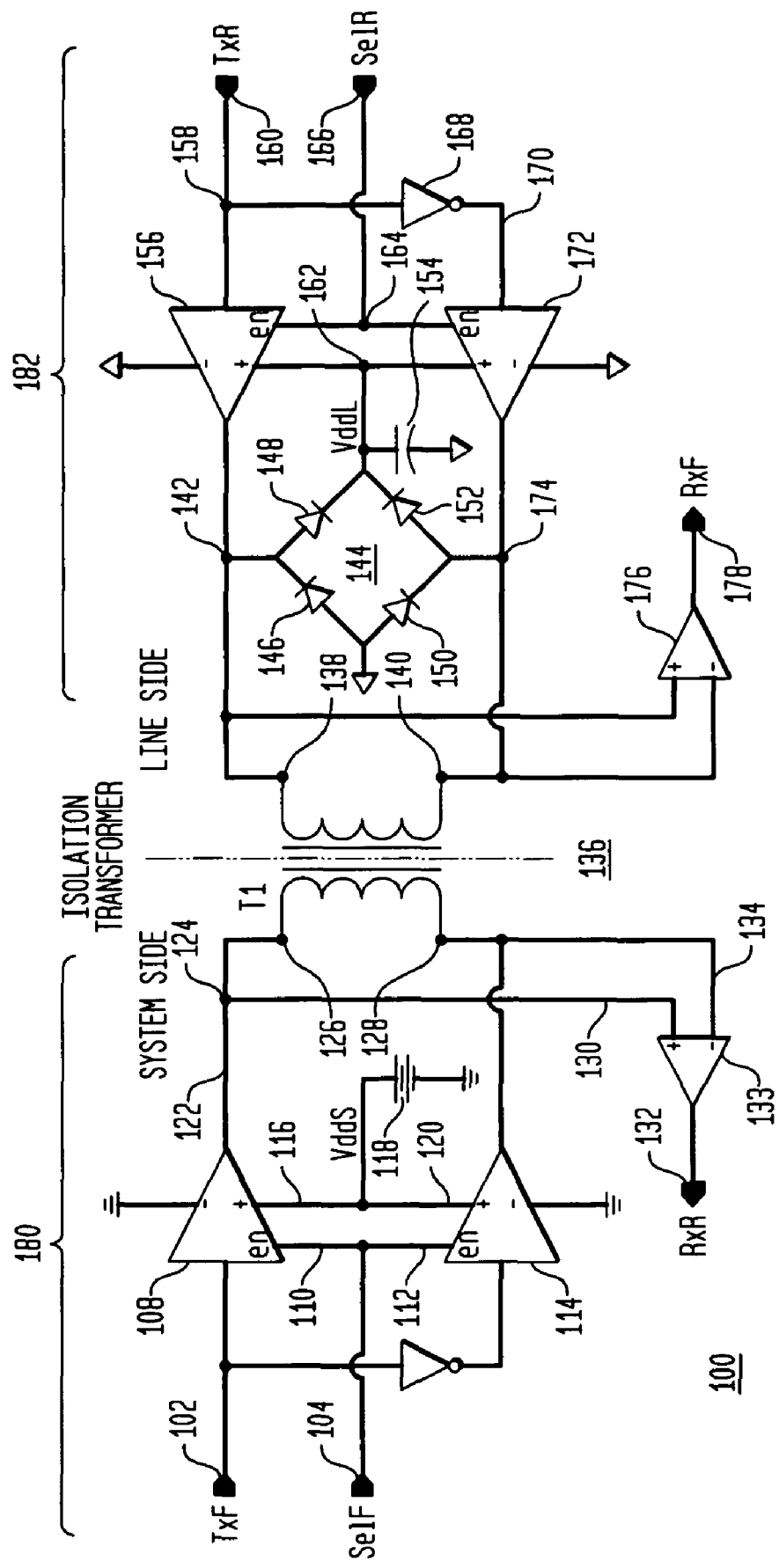
FIG. 1 is a block diagram depicting a digital communication link according to the invention.

FIG. 1 depicts a digital communication link according to the invention. Digital communication link 100 comprises system-side interface circuit ("SSIC") 180 and line-side interface circuit ("LSIC") 182, separated by the STIB 136. Preferably, each of SSIC 180 and LSIC 182 are integrated respectively on a single integrated circuit. The STIB 136 is preferably a surface-mounted component with a high power capacity and low impedance. Each of SSIC 180 and LSIC 182 include at least one tri-state buffer 108, 156 connected to the STIB 136 (at nodes 126 and 138) for transmitting signals across the STIB 136. Each of SSIC 180 and LSIC 182 further includes a receive buffer 133, 176 connected to the STIB 136, for receiving signals transmitted by the other interface circuit. Each of buffers 108, 156, 133 and 176 are preferably amplifying-type buffers, which respectively amplify either the signal to be transmitted across the STIB 136 or the received signal received via the STIB 136.

SSIC 180 and LSIC 182 may also include additional tri-state buffers 114 and 172 and associated inverters 106, 168, which in conjunction with tri-state buffers 108 and 156 may form a push-pull amplifier. The push-pull (or "double-ended") configuration provides a high power capacity and a large voltage swing across the primary and/or secondary windings of the STIB 136.

In digital communication link 100, both power and data may be communicated between the SSIC 180 and the LSIC 182 across the STIB 136, via a frame-based TDM (time-division-multiplexed) communication protocol. In each frame, representing a predetermined time period, SSIC 180 and SLIC 182 alternate between transmitting and receiving, as determined by control signals SelF and SelR provided by selection control logic (not shown). During the first period of a frame, for example, a predetermined selection control signal SelF at pin 104 enables tri-state buffers 108, 114 on the system side, while a complementary control signal SelR input at pin 166 disables tri-state buffers 156, 172 on the line side. As a result, forward-going data signal TxF (a forward-going pulse stream) received at pin 102 is amplified and transmitted via system-side tri-state buffers 108, 114 onto the system side winding of transformer T1 and subsequently passed to line-side receive buffer 176 via the line side winding of transformer T1. The forward-going data signal is then output at pin 178 as the forward data signal RxF. Similarly, for reverse transmission from the line side to the system side, control signals SelF and SelR are provided to enable tri-state buffers 156, 172 and disable tri-state buffers 108, 114. Data signal TxR (a reverse-going pulse stream) is thus amplified and transmitted across the transformer, received at receive buffer 133, and output as reverse data signal RxR.

LSIC 182 preferably includes a power circuit for receiving power from SSIC 180 across STIB 136. More specifically, rectifier 144 and a storage device such as supply capacitor 154 are connected across the secondary winding of the STIB 136 (at nodes 138, 140). Rectifier 144 may be a diode bridge rectifier comprising diodes 146, 148, 150, and 152 as shown. Diodes 146, 148, 150 and 152 are preferably Schottky diodes with a low turn-on voltage. Via rectifier 144 and supply capacitor 154, the forward data pulse stream (which effectively represents an AC signal) comprising signal TxF appearing at the line-side winding of transformer T1 may be converted to a DC voltage VddL at node 162. This DC voltage VddL may then be used to provide the supply voltage for the line-side circuitry.

Rectifier 144 may be implemented from four diodes integrated onto the same integrated circuit die as LSIC 182 and connected to the pair of terminals that connect LSIC 182 to the line side of the transformer. In this implementation, each pad (at nodes 138 and 140) is provided with a diode connected "up" to the positive voltage supply VddL and a diode connected "down" to ground, thus forming a rectifying bridge. Thus, diode pairs 146, 148 and 150, 152 respectively form half-wave rectifiers for the input signals at nodes 142 and 174, and together form a full-wave rectifier for the differential signal between node 142 and 174. In this embodiment, the input signal preferably has an average energy that is sufficiently large to cause the diode rectifier 144 to operate (i.e., has an amplitude that is greater than the cut-in voltages of the diodes).

Preferably, diodes 146, 148, 150, and 152 are capable of withstanding a transient ESD impulse of about 1000 volts to about 2000 volts and have sufficient current-carrying capacity to protect the integrated circuit die from electrostatic discharges. When an ESD event occurs, the transient voltage is simply shunted to the appropriate supply rail (ground or supply voltage VddL). In this embodiment, diodes 146, 148, 150, and 152 serve not only as rectifying diodes but also as the primary ESD protection diodes for the input pins for LSIC 182, and indeed may serve as the sole ESD protection devices for those pins.

A synchronous rectifier may also be used, either as an alternative to the diode bridge rectifier described above or in conjunction with it. If both the diode bridge and the synchronous rectifier are present, then the diode bridge may be used to generate the initial start-up voltage that is needed for operation while the LSIC 182 is initially powering up (e.g., while the control logic for the synchronous rectifier lacks sufficient voltage to operate). The synchronous rectifier may then be used for rectification after the initial start-up voltage reaches a level high enough for the synchronous rectifier to operate. In a further embodiment, diodes 146, 148, 150 and 152 may be parasitic diodes formed by the various semiconductor junctions in the transistors in the synchronous rectifier, as further described below.

Figure 2:
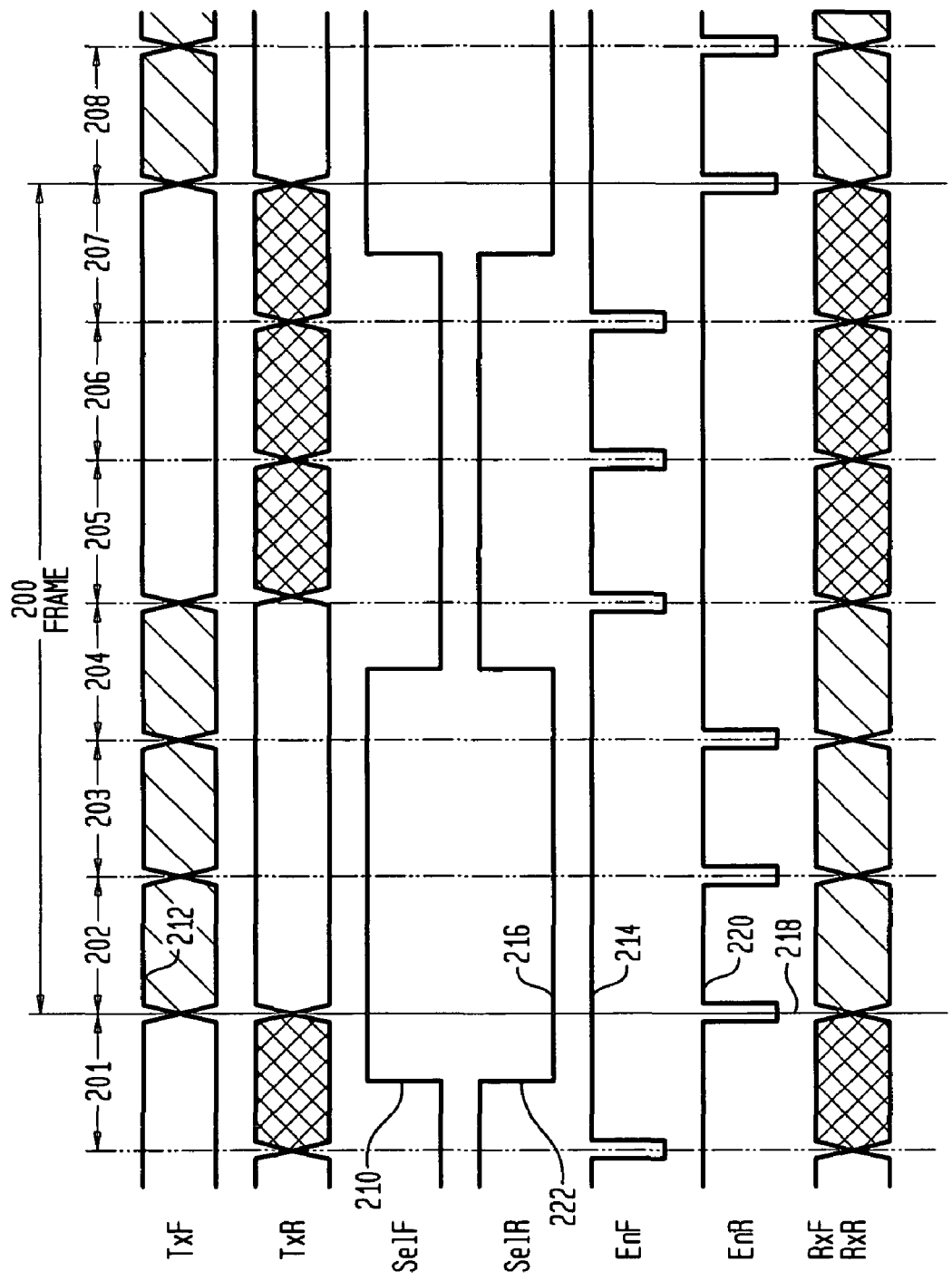
FIG. 2 is a timing diagram illustrating the operation of a digital communication link according to the invention.

The operation of digital communication link 100, and the various signals therein, may be more fully understood with reference to the timing diagram shown in FIG. 2. A suitable TDM protocol may be based on a repeating frame 200, shown as bit periods 202 through 207. During bit period 201 (the bit period before the start of frame 200), control signal SelF is enabled (at 210) while control signal SelR is disabled (at 222), and continue in those respective states through bit period 202 and 203 and the initial portion of bit period 204. As a result, during bit periods 202, 203 and 204, signal TxF (the forward pulse stream) is transmitted via tri-state buffers 108 and 114 across transformer T1 and received as signal RxF, as indicated by the single-line shading in the TxF and RxF lines.

The LSIC 182 transmits during the latter portion of frame 200, i.e., in bit periods 205-207. During bit period 204, control signals SelF and SelR are reversed in polarity, such that the line-side tri-state buffers 156, 172 are enabled while the system side tri-state buffers 108, 114 are disabled. Accordingly, during bit periods 205-207, signal TxR (the reverse pulse stream) is transmitted via line-side tri-state buffers 156, 172 across transformer T1 and received as signal RxR, as indicated by the cross-hatching in the TxR and RxR lines during bit periods 205-207.

Receive buffers 133 and 176 may be active throughout frame 200. Thus, signal TxF at the system side can then be received by both buffer 133 and buffer 176 and output at pins 132 and 178, respectively, during the first portion of frame 200. Correspondingly, during the second portion of frame 200, signal TxR at the line side is received by both buffers 133 and 176. For this reason, the RxF and RxR signals in FIG. 2 are represented by only one signal line, designated RxF/RxR. Signals EnF and EnR in FIG. 2 are used to improve power transfer and will be further described below.

In order to avoid saturating the transformer, the communication signals across the STIB 136 are preferably flux-balanced. By way of example, the flux-turns product limit of a transformer suitable for use in a modern modem system might be about 2.35 microvolt-seconds, or 652.5 nanoseconds at 3.6 volts. Accordingly, the transmission protocol should provide a DC balanced code, e.g., over two data frames. By way of example, Manchester encoding or alternate mark inversion ("AMI") may readily be employed in the present invention.

Figure 3:
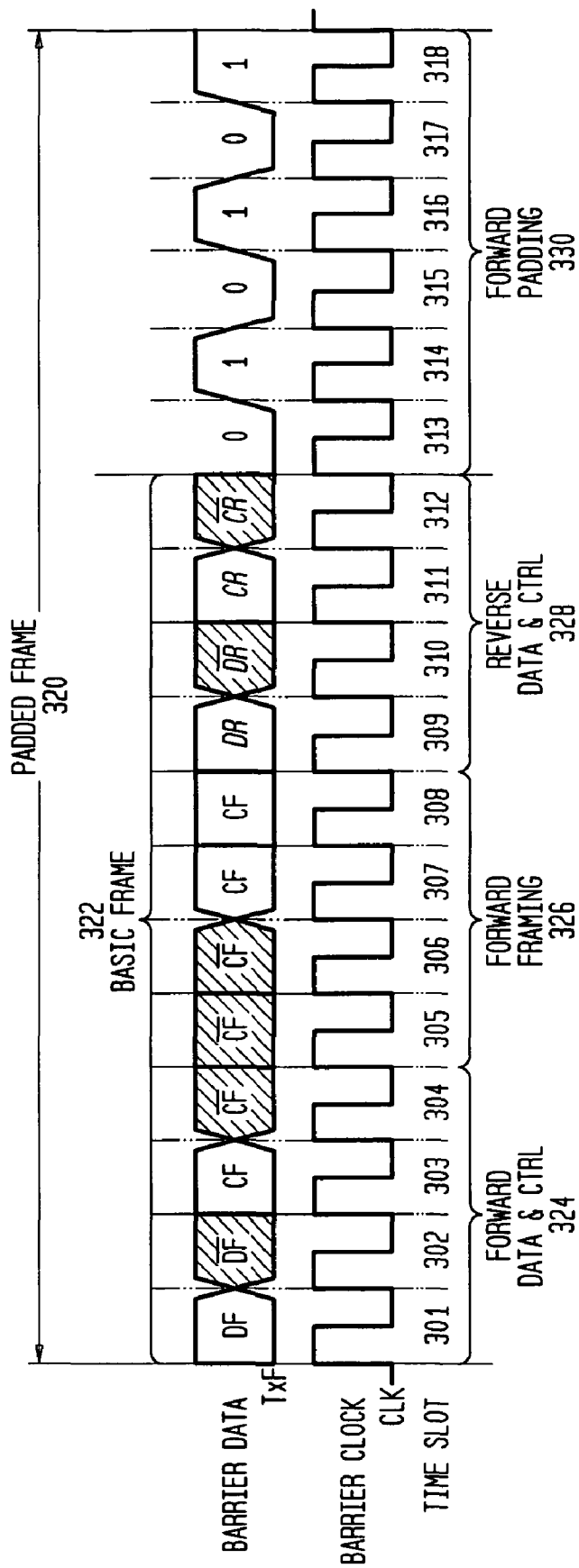
FIG. 3 is a framing diagram illustrating the composition of a frame suitable for use in a digital communication link according to the invention.

FIG. 3 depicts a communication protocol suitable for use with the present invention, in which the flux of the STIB 136 is balanced by using a Manchester-type encoding scheme (i.e., encoding a 0 bit as the two-bit sequence 01 and encoding a 1 bit as the two-bit sequence 10). In contrast to the protocol of FIG. 2 above, the protocol of FIG. 3 employs time-division multiplexing but allocates different amounts of time to the SSIC 180 and the LSIC 182, in order to allow the forward transmission of a framing sequence.

More specifically, in the protocol of FIG. 3, the SSIC 180 transmits during time slots 301-308 and the LSIC 182 transmits during time slots 309-312. The basic frame 322 in FIG. 3 may include:

(1) a forward data bit during time slots 301 and 302 (shown Manchester-encoded as DF, followed by NOT DF);

(2) a forward control bit during time slots 303 and 304 (shown as CF, NOT CF);

(3) a predetermined forward framing sequence 326 during time slots 305-308 (shown as NOT CF, NOT CF, CF, CF);

(4) a reverse data bit during time slots 309 and 310 (shown as DR, NOT DR); and (5) a reverse control bit during time slots 311 and 312 (shown as CR, NOT CR).

Figure 4:
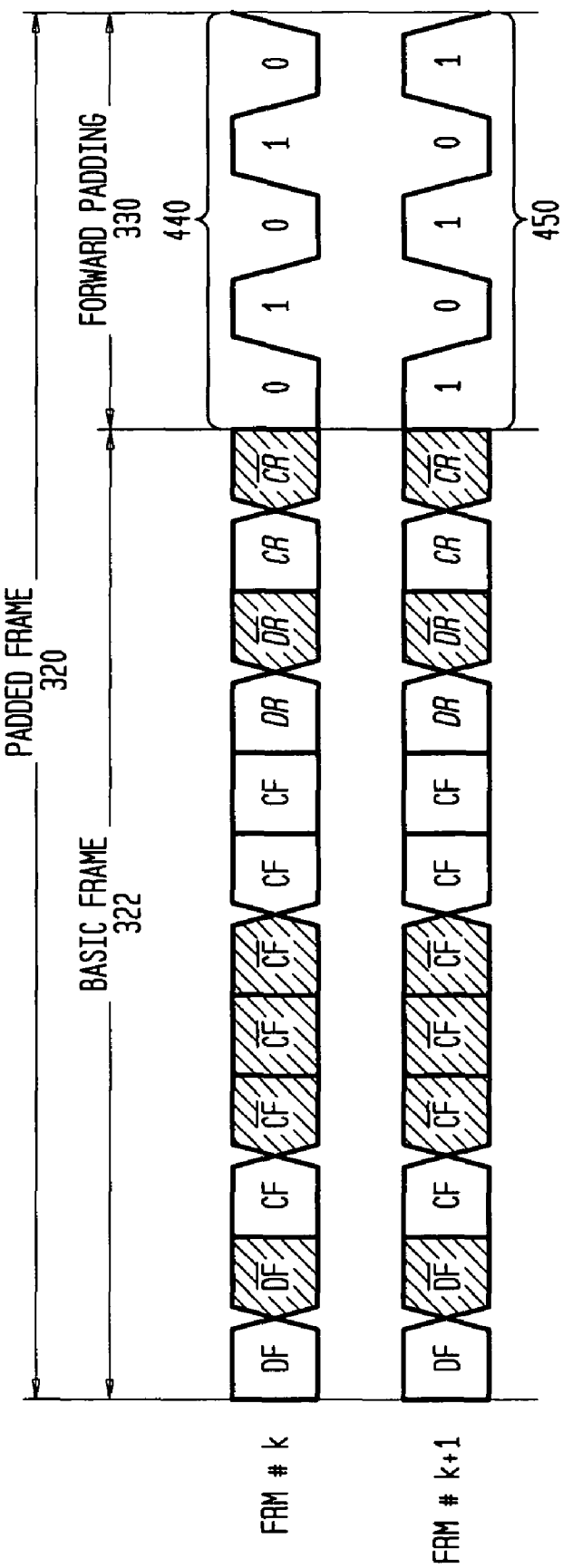
FIG. 4 is a further framing diagram illustrating the composition of a frame having an odd-numbered quantity of cycles, suitable for use in a digital communication link according to the invention.

The protocol of FIG. 3 may also include dummy or padding bits 330, which may be added or removed to adjust the frame size. In this way, a wide variety of data rates may be accommodated without altering the clock rate of the SSIC 180 and the LSIC 182. By way of example, six padding bits (e.g., 0, 1, 0, 1, 0, 1), of alternating values in order to achieve flux balance, are depicted in time slots 313-318. As shown in FIG. 4, an odd-number of padding bits may also be accommodated by balancing the flux of the padding bits over two consecutive frames, Frame k and Frame k+1. For example, if frame k contains the padding bit sequence [01010], frame k+1 may contain the sequence [10101].

The forward framing sequence may be any unique sequence of bit values that may be used to identify where a frame starts and/or ends. For example, in the protocol shown in FIG. 3, the inverse control bit (NOT CF) in time slot 304 is repeated twice thereafter, in time slots 305 and 306. This thrice-repeated value provides a unique synchronization ("sync") pattern that may readily be identified, insofar as Manchester encoded signals (01, 10) never result in a three-time-slot sequence of the same values. A suitable detection circuit for this sync pattern may be implemented, for example, via a three-bit shift register, where each bit in the register is provided to a 3-input AND gate that outputs a signal when the thrice-repeated value is detected. Other frame detection techniques may also be used in lieu of the sync pattern described above. For example, a large buffer may be used to store incoming data, and the buffered data may then be statistically analyzed by a microprocessor to determine the framing, in accordance with techniques known in the art.

Figure 5:
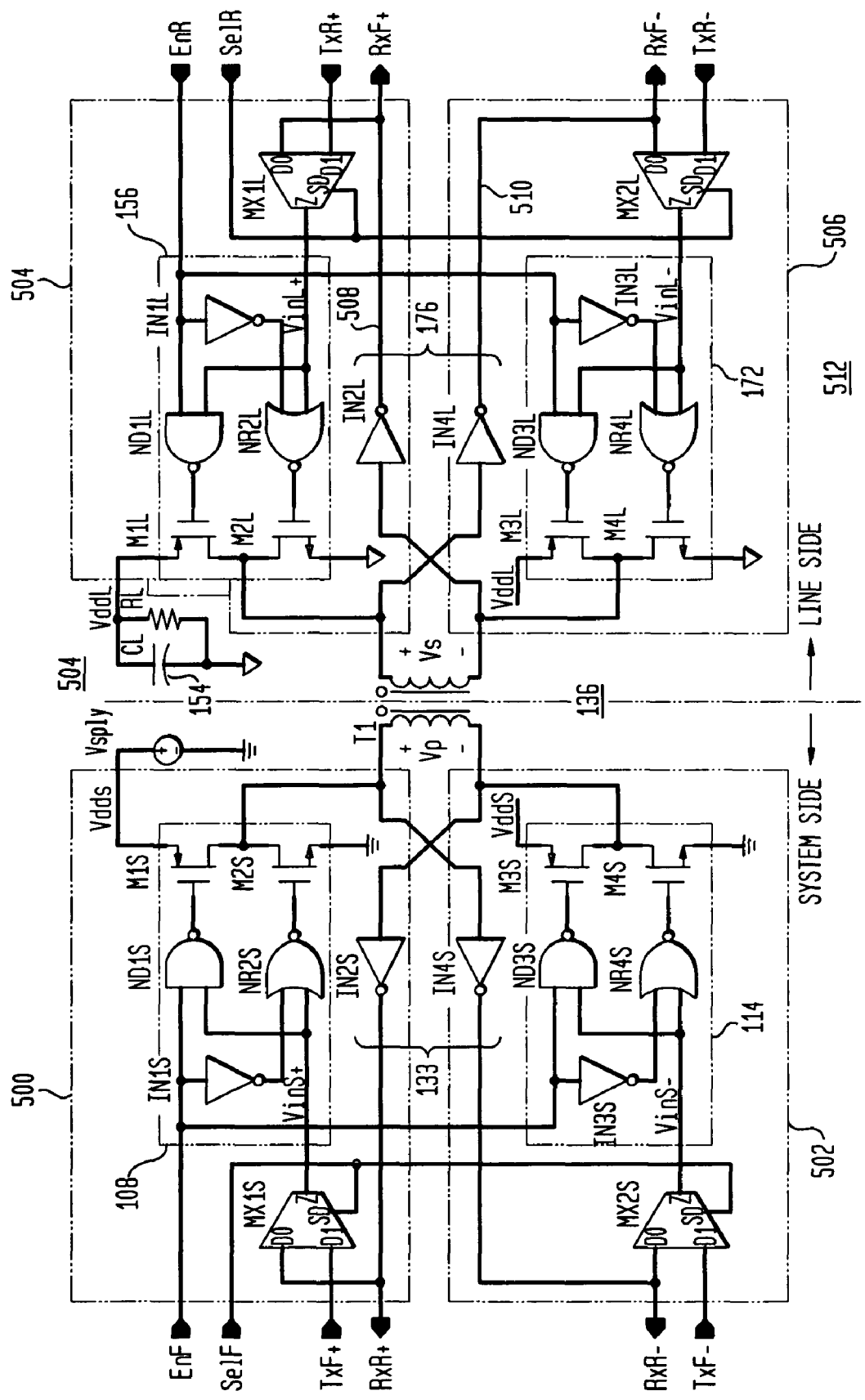
FIG. 5 is a circuit diagram further illustrating a digital communication link according to the invention.
Figure 6:
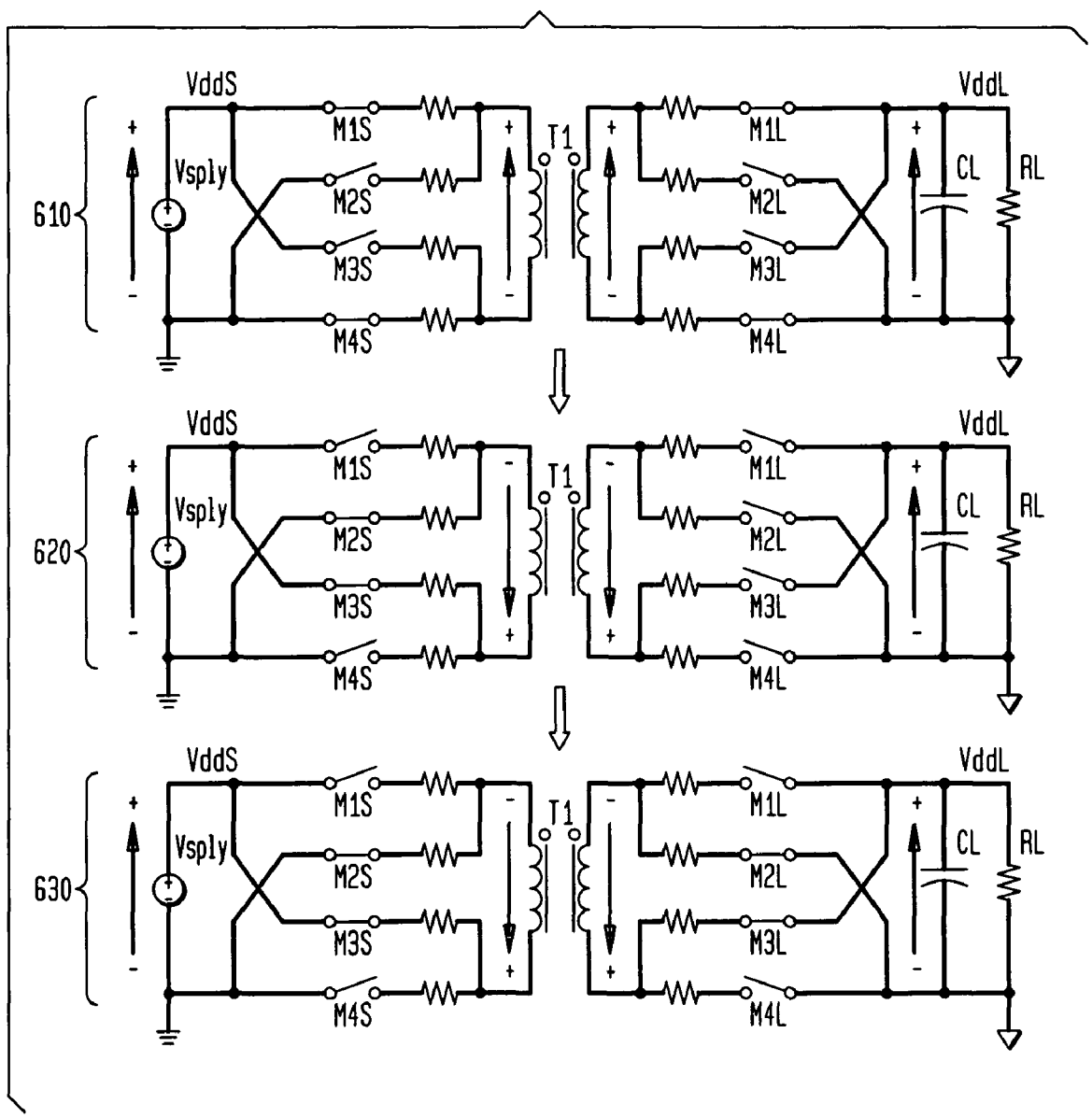
FIG. 6 is a conceptual diagram illustrating the transfer of power in a digital communication link according to the invention.

FIGS. 5 and 6 illustrate a further embodiment of the invention, in which the rectifier and tri-state buffer functions of the LSIC 182 shown in FIG. 1 are provided by a novel "rectifying buffer," and in which the interface circuits include feedback paths that enhance the transfer of power from the SSIC 180 to the LSIC 182. With reference to FIG. 5, rectifying buffer 504 comprises a tri-state buffer 156 connected to a supply capacitor and to the STIB 136 via interface terminal Vs+, a mode switch MX1L connected to the tri-state buffer, and a feedback path 508 between the STIB 136 and the mode switch MX1L. Rectifying buffer 504 further has a "receive output terminal" for outputting signal RxF+ and a transmission input terminal for receiving signal TxR+. Tri-state buffer 156, in turn, comprises a complementary transistor pair M1L (a P-channel MOSFET) and M2L (an N-channel MOSFET), NAND logic gate ND1L connected to one transistor in the pair (M1L), NOR logic gate NR2L connected to the other transistor in the pair (M2L), and inverter IN1L connected between the ENABLE inputs of the NAND and NOR gates.

In accordance with this embodiment of the invention, the complementary transistor pair 156, 172 in the tri-state buffer serves both as an output driver for transmitting signals to the SSIC 180, and as a synchronous rectifier for rectifying signals received from the SSIC 180. Rectifying buffer 504 effectively has two modes: a transmit mode and a rectifying mode, depending on the state of mode switch MX1L. The mode switch MX1L is controlled in turn by line-side interface control logic (not shown).

The LSIC 182 and SSIC 180 are preferably configured to communicate in accordance with a TDM protocol such as that depicted in FIGS. 2-4. In particular, the SSIC 180 transmits during a predetermined time slot of a TDM frame (the "forward transmit period"), and the LSIC 182 transmits during a different time slot of the frame (the "reverse transmit period"). During the forward transmit period, while the SSIC 180 transmits over the STIB 136, the line-side interface control logic (not shown) provides a suitable SelR signal (e.g., a zero-volt signal) to place the rectifying buffer in a rectifying mode, in which a substantial portion of the energy in the forward data transmitted by the SSIC 180 is diverted and stored in supply capacitor $C_L$. During the reverse transmit period, when the LSIC 182 is scheduled to transmit reverse data over the STIB 136, a suitable SelR signal (e.g., a 3.5-volt signal) is provided, which causes the rectifying buffer to operate as a conventional tri-state buffer (i.e., to pass data signals from the SLIC to the SSIC 180 via the STIB 136).

Because the signal transmitted over the STIB 136 is preferably a differential signal (a.k.a. double-ended or ungrounded), a second rectifying buffer 506 may also be provided in LSIC 182. The second rectifying buffer 506 similarly includes a tri-state buffer 172, a mode switch MX2L, and a feedback path 510. Tri-state buffer 172 includes complementary transistors M3L and M4L, NAND logic gate ND3L, NOR logic gate NR4L, and inverter IN3L. Together, rectifying buffer 156 and rectifying buffer 172 form a differential rectifying buffer 512.

FIG. 6 illustrates how differential rectifying buffer 512 may operate to rectify a differential signal transmitted by the SSIC 180 over the STIB 136, in order to provide power to a supply capacitor $C_L$ in the LSIC 182. FIG. 6 depicts several states of a simplified circuit diagram of a differential push-pull transmitter (represented by switches M1S, M2S, M3S and M4S with associated internal resistances) connected via a STIB 136 to a differential rectifying buffer (represented by switches M1L, M2L, M3L, and M4L with associated internal resistances) and a supply capacitor $C_L$. Three consecutive states of the circuit are shown in diagrams 610, 620 and 630, in which the transmitter transitions from transmitting a value "1" (diagram 610) to a value "0" (diagram 630). Since a differential transmitter is conventionally implemented via two sets of complementary transistors in a push-pull configuration, switches M1S and M2S represent the two complementary transistors in the upper leg of the differential transmitter, while switches M3S and M4S represent the two complementary transistors in the lower leg.

In accordance with the invention, the switches comprising differential rectifying buffer 512 are operated as a synchronous rectifier. Diagram 610 depicts an exemplary state of the circuit, in which a "one" transmission bit is transmitted from SSIC 180 to LSIC 182 by closing switches M1S and M4S and opening switches M2S and M3S. A forward current loop is created from a supply source Vsply through switch M1S, through the primary winding of the STIB 136, and finally through switch M4S to ground (ignoring the internal resistances). On the line side, switches M1L and M4L are closed, while switches M2L and M3L are opened. As a result, the current that is imposed on the secondary winding of the STIB 136 flows through switch M1L, through load impedance $R_L$, and finally through switch M4L, while at the same time charging supply capacitor $C_L$.

In diagram 620, all of the switches in the differential rectifying buffer are opened, in order to break the flow of current through the secondary winding of the STIB 136. During this time period, the LSIC 182 loads are supplied only by supply capacitor $C_L$. Because there is no load current on the line side through the transformer secondary, the polarity of the transformer primary can easily be changed by closing switches M2S and M3S and opening switches M1S and M4S. Accordingly, the current path in the transmitter in diagram 620 is from supply source Vsply through switch M3S, through the transformer primary (with opposite polarity), and then through switch M2S to ground.

Finally, in diagram 630, switches M1L and M4L on the line side are opened, while switches M2L and M3L are closed. Because the polarity on the transformer has been flipped, the transformer secondary is now reconnected to the load with the correct polarity. Current still flows into the positive terminal of capacitor $C_L$, and thus power continues to be transferred from SSIC 180 to LSIC 182 during the bit period in which the "zero" value is being transmitted by the SSIC 180. Thus, the signal from SSIC 180 has been rectified by the differential rectifying buffer by operating the switches M1L, M2L, M3L and M4L in substantial synchronism with that signal.

The "break before make" step illustrated in diagram 620 is optional. If it is omitted, however, the system side transmitter will likely have to be significantly more powerful (and therefore larger) than the line side switches, in order to override the flow of current through the transformer secondary. In contrast, in the "break before make" implementation described above, the line side switches may be approximately equal in size to the system side switches. The break-before-make time interval is preferably sufficiently long to interrupt or substantially reduce the flow of current in the secondary. In certain applications, for example in high-speed modem applications, a time interval of a few nanoseconds is sufficient for this purpose.

Referring again to FIG. 5, the various signals in the embodiment depicted in FIG. 5 are shown in the table below. All of the signals are differential, or complementary, with the exception of the select signals and the enable signals.

| Signal | Function |
|---|---|
| EnF | Enable Forward Transmission |
| SelF | Select Forward Transmission |
| TxF+ | Transmit Forward Data (Pos) - "Positive" differential input for data to be transmitted from the SSIC 180 to the LSIC 182 across the isolation barrier |
| TxF− | Transmit Forward Data (Neg) - "Negative" differential input for data to be transmitted from the SSIC 180 to the LSIC 182 across the isolation barrier |
| RxR+ | Received Reverse Data (Pos) - "Positive" differential input for data received by the SSIC 180 from the LSIC 182 across the isolation barrier |
| RxR− | Received Reverse Data (Neg) - "Positive" differential input for data received by the SSIC 180 from the LSIC 182 across the isolation barrier |
| EnR | Enable Reverse Transmission |
| SelR | Select Reverse Transmission |
| TxR+ | Transmit Reverse Data (Pos) - "Positive" differential input for data to be transmitted from the LSIC 182 to the SSIC 180 across the isolation barrier |
| TxF− | Transmit Reverse Data (Neg) - "Negative" differential input for data to be transmitted from the LSIC 182 to the SSIC 180 across the isolation barrier |
| RxF+ | Received Forward Data (Pos) - "Positive" differential input for data received by the LSIC 182 from the SSIC 180 across the isolation barrier |
| RxF− | Received Forward Data (Neg) - "Negative" differential input for data received by the LSIC 182 from the SSIC 180 across the isolation barrier |

The RxF+ signal is derived from the negative terminal Vs− of the transformer secondary and then inverted by inverter IN2L, while the RxF− signal is derived from the positive terminal Vs+ of the transformer secondary and inverted by inverter IN4L. As a result, the signal at RxF+ tracks the signal value at terminal Vs+, and the signal at RxF− tracks the signal value at terminal Vs−.

As noted above, the SelR signal controls the mode of the differential rectifying buffer. Mode switch MX1S operates as a multiplexer to select either the RxF+ signal at pin D0 or the TxR+ signal at pin D1, depending on the value of the SelR signal input at pin SD of the mode switch MX1S.

If signal SelF is low (e.g., for the "Rectify" mode), then the RxF+ signal is selected and passed to the Z output pin of the mode switch MX1S. The signal output from the mode switch MX1S is in turn input to the tri-state buffer 156, and the complementary transistors M1L and M2L in the tri-state buffer 156 take on the RxF+ value. For example, when the RxF+ signal is "high," transistor M2L opens (i.e., enters a substantially nonconductive state) and transistor M1L closes (i.e., enters a substantially conductive state), effectively connecting the positive terminal of the transformer secondary to supply capacitor $C_L$ and thereby charging the supply capacitor to supply voltage VddL. Simultaneously, the corresponding RxF− signal will be low, since it is the inverse of the RxF+ signal. The mode switch MX2L passes the low RxF− signal to tri-state buffer 172, causing transistor M3L to open and transistor M4L to close. The negative terminal Vs− of the transformer secondary thus is effectively connected to the line-side isolated ground. Thus, the current loop formed through (a) the positive terminal Vs+ of the transformer secondary, (b) transistor M1L, (c) supply capacitor $C_L$, (d) the isolated ground node, and (e) the negative terminal Vs− of the transformer secondary is completed, and power is thus transmitted from the SSIC 180 to the LSIC 182.

Once a given value for the RxF+ and RxF− signals is established, a positive feedback loop is created which effectively latches the values in, provided that the SelR signal is low and further assuming the tri-state buffer is "enabled" by an appropriate EnR signal. This latching effect may be a significant issue if the transistors on the SSIC 180 are not large enough to "overdrive" the transistors on the LSIC 182. Accordingly, the present invention provides a "break-before-make" switching scheme, as described above with reference to FIG. 6, to interrupt the latch and allow new transmission values to be imposed on the transformer. In particular, the EnR signal may be used to disable the tri-state buffers for a short time, thereby interrupting the latch and allowing the transmitting circuitry more easily to force the transformer to the next data state (either high or low). Alternatively, the Select lines (SelF and SelR) may also be used to disable or interrupt the latch.

To place the differential rectifying buffer in "transmit" mode, a "high" SelR signal is provided to mode switches MX1L and MX2L. Incoming data TxR+ and TxR− are therefore passed through the mode switches MX1L and MX2L to the tri-state buffers 156, 172. Accordingly, the complementary transistors M1L, M2L, M3L and M4L impose the TxR values on the secondary of the transformer, thereby transmitting reverse data to the SSIC 180.

The differential rectifying buffer configuration described above may also be applied in the SSIC 180, as shown in FIG. 5. During the TDM time interval when the SSIC 180 is to receive rather than transmit, tri-state buffers 108 and 114 are caused to latch to, and mirror, the forward pulse stream transmitted by the LSIC 182, as a result of the positive feedback through mode switches MX1S and MX2S and tri-state buffers 108 and 114. At the end of each TDM bit period, just before a new value is to be transmitted by the LSIC 182, the SSIC 180 switches are briefly disabled (e.g., placed in a high-impedance state) for a short period of time in the same "break-before-make" fashion described above. The LSIC 182 thus has an opportunity to impose new data values on the transformer without interference from the SSIC drivers. When the SSIC 180 switches are re-enabled, the SSIC 180 latches to, and amplifies, the new value. In effect, a master-slave relationship arises between the transmitting circuitry and the receiving circuitry, wherein the slave circuit latches in the value that is transmitted by the master.

Significantly, once the tri-state buffers 108 and 114 in SSIC 180 latch to a given value, an amplified drive current flows from supply source Vsply through transistors M1S, M2S, M3S and M4S. This amplified current is added to the current in the transformer primary, thus causing a correspondingly greater current to flow through the transformer secondary and in effect creating a supplemental pulse stream that is transferred to the rectifier in LSIC 182. More specifically, the additional current that arises in the transformer secondary represents power and energy that originated in the supply source Vsply on the system side and was transferred to the supply capacitor $C_L$ on the line side. Thus, in the latched state, power may actually be transferred forward from the STIB 136 to the LSIC 182, even though the LSIC 182 is transmitting. As a result, the stability of the voltage at supply capacitor $C_L$ is dramatically improved, because power is transferred to the LSIC 182 both when the SSIC 180 transmits and when the LSIC 182 transmits.

The operation of the LSIC 182 and SSIC 180 may be further understood with reference to the timing diagram in FIG. 2 in conjunction with FIG. 5. Assuming that the SSIC 180 is about to transmit to the LSIC 182, signal SelF is caused to transition "high" (210) and the SelR signal to transition low (222). Thus, mode switches MX1S and MX2S are set to select and output the TxF (+/−) signals. A "high" TxF+ signal (212 in bit period 210) will thus be passed as a "high" signal to node VinS+, while the corresponding differential "low" TxF- signal at will be passed to node VinS-. The signals at nodes VinS+ and VinS- are then input to the logic gates ND1S, ND3S and to the NOR gates NR2S and NR4S.

The EnF signal is also input into logic gates ND1S and ND3S, while its inverse (after inverters IN1S and IN3S) is input into logic gates NR2S and NR4S. Because the EnF signal is high (at 214) and the VinS+ signal (which corresponds to the high TxF signal 212) is also high, logic gate ND1S produces a "low" signal at its output, causing p-type transistor M1S to "close" and thereby effectively connecting the Vp+ terminal of transformer T1 to the supply voltage VddS. At the same time, because the inverse of the EnF signal is a "low" signal and the VinS+ signal is "high," the NOR gate NR2S produces a "low" signal at its output, causing n-type transistor M2S to open and thereby breaking the path between the Vp+ terminal of transformer T1 and ground.

Conversely, as a result of the "low" signal at VinS-, in conjunction with the "high" EnF signal and its "low" inverse, logic gate ND3S outputs a "high" signal to p-type transistor M3S and causes it to open, while logic gate NR4S outputs a "low" signal to transistor M4S and causes it to close. As a result, the terminal Vp- of transformer T1 is effectively connected to ground. Thus, it may be seen that a "high" signal input at TxF causes a "high" signal at the transformer secondary: terminal Vp+ is effectively connected to supply voltage VddS, and terminal Vp- is effectively connect to ground. It should be understood that during this period of time, the voltage at terminal Vp+ is preferably equal to or greater than the supply voltage VddS, and the voltage at terminal Vp- is preferably equal to or less than the voltage at ground, so that current tends to flow in the desired direction.

Shortly before the "high" signal is placed on the primary winding Vp of the transformer, the receiving latches, tri-state buffers and associated transistors in the LSIC 182 may be disabled by a "low" EnR signal (at time 218 in FIG. 2). As a result, transistors M1L, M2L, M3L, M4L are all placed in a nonconductive state, so that there is no opposing voltage or current that would otherwise tend to resist the imposition of the "high" Vp signal on the primary and secondary windings of the transformer T1. Thus, the "low" EnR signal disables the tri-state buffers and interrupts the reinforcement of the latched signal.

Because there is no current in the secondary that would tend to resist a change in value at Transformer T1, it is more easily able to transfer the "high" signal at Vp+ to a "high" signal at Vs+, and the "low" signal at Vp- to a "low" signal at Vs-. The "high" and "low" signals at Vs+ and Vs- are respectively inverted by inverters IN4L and IN2L to produce "low" and "high" received signals at RxF- and RxF+, respectively.

The LSIC 182 is preferably placed in a "receive" or "latch" mode by a "low" SelR signal at 222 that causes mode switches MX1L and MX2L to select and output the received signals RxF- and RxF+ instead of the reverse transmission signal TxR. Thus, mode switch MX1L outputs a "low" signal to VinL+, while mode switch MX2L outputs a "high" signal to VinL-.

Meanwhile, the EnR signal is returned to a "high" state (at 220 in FIG. 2), thus placing the NAND and NOR gates in operative states. Because logic gate ND1L at this point has as its inputs the "high" signal at VinL+ and the "high" EnR signal, it outputs a "low" signal, thus closing p-type transistor M1L. Logic gate NR2L, having as inputs the "high" signal at VinL+ and the "low" input at the output of inverter IN1L (i.e., the inverted EnR signal), produces a "low" output signal, thus opening n-type transistor M1L. Current accordingly flows from Vs+ through M1L to VddL, thus charging up capacitor CL. In this manner, power is transferred from the SSIC 180 to the LSIC 182 power supply (formed in part by CL) during the forward transmission from the SSIC 180 to the LSIC 182.

Conversely, logic gate ND3L, having as inputs the "low" signal at VinL- and the "high" EnR signal, outputs a "high" signal to p-type transistor M3L, causing it to open. And logic gate NR4L, having as inputs the "low" signal at VinL- and the "low" inverted EnR signal, outputs a "high" signal to n-type M4L, thus causing it to close. The closing of transistor M4L completes the circuit path for current flowing through power supply capacitor CL and load resistance RL to return to the Vs- at the transformer T1.

Thus, a "latched" condition arises in the LSIC 182, because Vs+ is electrically connected to VddL while Vs- is electrically connected to the isolated ground, and because positive feedback via inverters IN2L, IN4L, mode switches Mx1L, Mx2L, and tri-state buffers BUF1S and BUF2S maintains the latched condition throughout bit period 202.

A supplemental rectifier may also be provided in the LSIC to provide start-up power when a DAA is initially powered up. If the supply capacitor $C_L$ is fully depleted, there will be insufficient voltage for the control logic to supply the enable and select signals that are needed for the differential rectifying buffer to operate. Accordingly, a small "boot-strap" rectifier (e.g., a diode rectifier or a synchronous rectifier) may be provided. When the SSIC starts transmitting, the supplemental rectifier is forced to follow the SSIC 180 signal, thereby transferring a small quantity of power that charges capacitor $C_L$. Once the line-side supply voltage VddL reaches a sufficiently high level for the LSIC logic to operate, the TDM protocol across the barrier may be established, including clock detection, synchronization, and initialization. The LSIC 182 may then enter the standard power mode in which both sides of the barrier are fully engaged in the master/slave configuration.

Advantageously, the parasitic diodes that exist within transistors M1L, M2L, M3L and M4L in the differential rectifying buffer described above may be used as the desired supplemental or boot-strap rectifier. More specifically, transistors M1L and M3L are preferably P-channel MOSFETs, each having a parasitic p-n diode junction from its drain (connected respectively to transformer terminals Vs+ and Vs-) to its source (connected to positive supply voltage VddL). Similarly, transistors M2L and M4L are preferably N-channel MOSFETs, each having a parasitic p-n diode junction from its source (connected to ground) to its drain (connected respectively to transformer terminals Vs+ and Vs-). These parasitic diodes form a diode bridge that may be utilized to generate the initial start-up voltage that is needed to power up LSIC 182.

Moreover, the parasitic diodes within transistors M1L, M2L, M3L and M4L may also be used to provide ESD protection for the SSIC, as described in connection with diodes 146, 148, 150, and 152 above. In this embodiment, transistors M1L, M2L, M3L and M4L should be designed to withstand anticipated ESD impulse voltages and currents.

Figure 7:
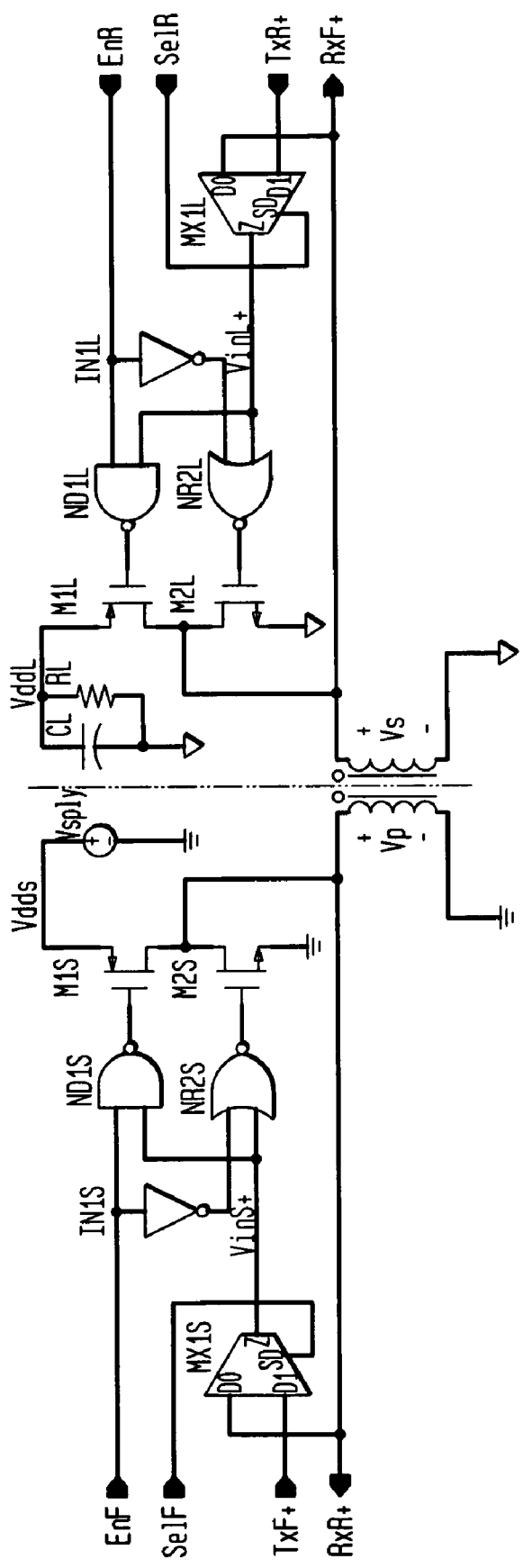
FIG. 7 is a circuit diagram illustrating a single-ended embodiment of a digital communication link according to the invention.

The present invention may also be implemented in a single-ended configuration, rather than a differential configuration. FIG. 7 depicts an exemplary single-ended embodiment. This embodiment is similar to the double-ended embodiment of FIG. 5, except that the negative terminals Vp- and Vs- of the transformer primary and secondary windings are connected to ground, and the primary terminals Vp+ and Vs+ are connected directly to RxR+ and RxF+, respectively. The single-ended embodiment depicted in FIG. 7 operates in the same manner as the double-ended embodiment of FIG. 5.

Figure 8:
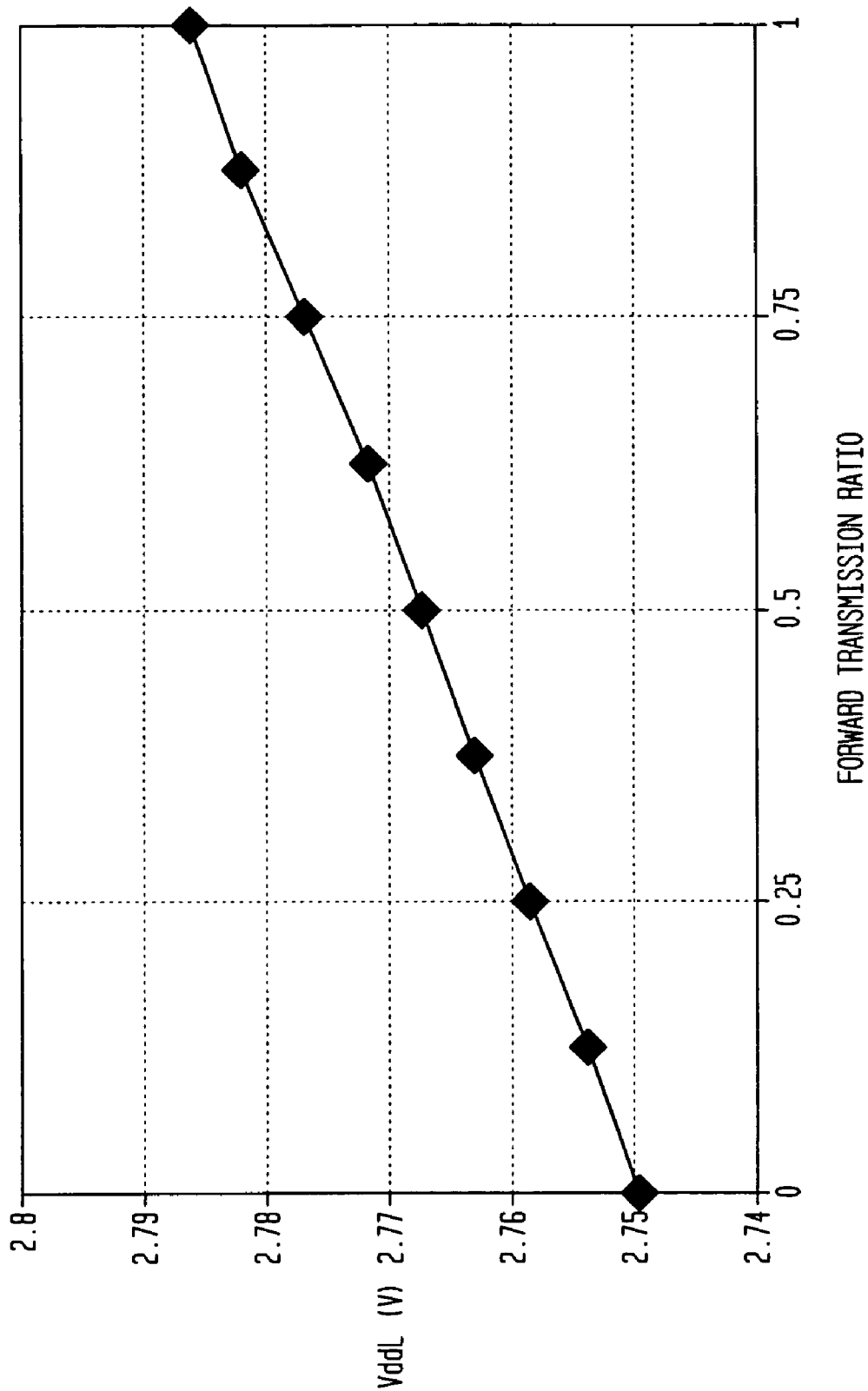
FIG. 8 is a chart illustrating the relationship between power transfer and the forward-to-reverse transmission ratio in a digital communication link according to the invention.

The chart in FIG. 8 illustrates the anticipated effectiveness of the power transfer between the system-side circuitry and the line-side circuitry using the present invention. More specifically, the y-axis represents the line-side supply voltage VddL generated across capacitor $C_L$ in the differential rectifying buffer embodiment described above. The x-axis represents the forward transmission ratio, which ranges between 0 and 1.0 (or 0% to 100%). It may be seen that the line-side supply voltage remains surprisingly stable (between 2.75 V and 2.79 V) regardless of the forward transmission ratio.

The present invention thus has several significant advantages over conventional DAAs. First, the transformer provides excellent high-voltage isolation between the primary and secondary windings. Second, common-mode noise rejection is greatly improved by the use of the STIB 136 and differential signaling across the interface. The latching technique described above further reduces common-mode noise, because the tri-state buffers are placed in a non-enabled state only for a very small portion of a standard bit period, so that even if common-mode noise were transferred across the barrier, it would only grow while the switches are disconnected (i.e., tri-stated). Third, because a single transformer is used as the isolation barrier for both data and power signals, there is a significant savings in component costs when compared with prior art systems that use multiple-component isolation barriers.

Finally, the use of STIB 136 allows a tremendous amount of power to be transferred from the SSIC to the LSIC, so that little, if any, power from a telephone line is needed for the LSIC. For example, in a typical modem, the line-side DAA and associated circuitry may require in the range of about 25 to about 50 milliwatts of power. Using the present invention, this amount of power (about 25 to about 50 milliwatts) may readily be transferred from the system-side circuitry to the line-side circuitry enough to operate the line-side circuitry without tapping power from the telephone line. In general, the amount of power that may be transferred using the present invention is limited primarily by the current-carrying capacity of the complementary transistors in the tri-state buffer rather than the power-transfer capacity of the STIB 136. Thus, it is feasible to provide large complementary transistors in the line-side and system-side circuitry, such that more than 50 milliwatts, or even as much as about 100 milliwatts of power or more, may be transferred across the STIB 136.

It will be recognized that the present invention may also be used in conjunction with prior art line-side circuits that tap power from a telephone line while a call is in progress (i.e., in an off-hook condition). If so, a portion of the line-side power may be obtained from the telephone line, while the remaining portion may be supplied by the system-side circuit in the manner described above. In this variation, any desired percentage (0% to 100%) of the power needed by the line-side circuit may be supplied from the system-side circuitry via the present invention. Preferably, at least a substantial portion (e.g., about 30%) of the power needed by the line-side circuit during a call is supplied by the system-side circuitry across the STIB 136. Still more preferably, the amount power supplied by the system-side circuitry across the STIB 136 is at least a majority, at least a super-majority, or approximately the entirety of the power needed by the line-side circuit.

It should also be understood that although the system-side interface circuits, line-side interface circuits, rectifying buffer and transmission protocols of the present invention have been described above in connection with the STIB 136, they are not limited to use with a transformer isolation barrier. Rather, they may be used with any transmission medium, including, for example, a four-port interface such as a two-wire twisted pair or a two-capacitor interface.

There has thus been described a digital communication link between system-side and line-side circuitry in a DAA, capable both of carrying both data signals and power signals. It will be understood, however, that the foregoing description of the invention is by way of example only, and variations will be evident to those skilled in the art without departing from the scope of the invention, which is as set out in the appended claims.

What is claimed is:

1. A communication link, comprising:
an isolation barrier including a transformer having a system-side winding and a line-side winding;
a system-side interface circuit connected to the transformer's system-side winding; and
a line-side interface circuit connected to the transformer's line-side winding, wherein:
  (a) the system-side interface circuit is capable of transmitting a digital data signal across the transformer to the line-side interface circuit, the digital data signal having energy to supply a substantial portion of the line-side interface circuit's electrical load, and
  (b) the line-side interface circuit is capable of rectifying the digital data signal to produce a line-side rectified voltage signal.

2. The communication link of claim 1, wherein the digital data signal has an amount of energy that is greater than about 30% of the line-side interface circuit's electrical load.

3. The communication link of claim 1, wherein the digital data signal has an amount of energy that is one of at least a majority, at least a supermajority, and approximately the entirety of the electrical load of the line-side interface circuit.

4. The communication link of claim 1, wherein the digital data signal has an amount of energy that is in the range of about 25 to about 100 milliwatts.

5. The communication link of claim 1, wherein the isolation barrier consists essentially of a single transformer consisting of one pair of windings comprising the line-side winding and the system-side winding.

6. The communication link of claim 1, wherein:
the line-side interface circuit comprises
  a first line-side buffer having an output connected to the transformer's line-side winding, and
  a line-side receive buffer connected to the transformer's line-side winding; and the system-side interface circuit comprises
  a first system-side buffer having an output connected to the transformer's system-side winding, and
  a system-side receive buffer connected to the transformer's system-side winding.

7. The communication link of claim 6, wherein:
the line-side interface circuit further comprises a second line-side buffer, and the output of the first line-side buffer is connected to a first terminal of the transformer's line-side winding and the output of the second line-side buffer is connected to a second terminal of the transformer's line-side winding, such that the first and second line-side buffers form a differential line-side buffer; and
the system-side interface circuit further comprises a second system-side buffer, and the output of the first system-side buffer is connected to a first terminal of the transformer's system-side winding and the output of the second system-side buffer is connected to a second terminal of the transformer's system-side winding, such that the first and second system-side buffers form a differential system-side buffer.

8. The communication link of claim 6, wherein the line-side interface circuit further comprises:
a line-side rectifier connected to the line-side winding of the transformer; and
a storage device connected to the line-side rectifier.

9. The communication link of claim 8, wherein the line-side rectifier is one of a half-wave diode bridge, a full-wave diode bride, and a synchronous rectifier.

10. A method of transferring digital data and power from a system-side circuit to a line-side circuit connected via an isolation barrier including a transformer having a system-side winding and a line-side winding, comprising the steps of:
inputting, into the transformer's system-side winding, a digital data signal having energy to supply a substantial portion of the line-side circuit's electrical load;
transforming the digital data signal at the transformer's system-side winding to a transformed digital data signal at the transformer's line-side winding;
providing a portion of the transformed digital data signal to a receive buffer;
rectifying another portion of the transformed digital data signal to create a rectified signal; and
storing the rectified signal.

11. The method of claim 10, wherein the digital data signal has an amount of energy that is greater than about 30% of the line-side interface circuits' electrical load.

12. The method of claim 10, wherein the digital data signal has an amount of energy that is at least a majority, at least a supermajority, or approximately the entirety of the electrical load of the line-side interface circuit.

13. The method of claim 10, wherein the digital data signal has an amount of energy that is in the range of about 25 to about 100 milliwatts.

14. The method of claim 10, wherein the isolation barrier consists essentially of a single transformer consisting of one pair of windings comprising the line-side winding and the system-side winding.

15. The method of claim 10, wherein the step of rectifying comprises the step of inputting the portion of the transformed digital data signal into at least one of a half-wave diode bridge, a full-wave diode bridge, and a synchronous rectifier.

16. The method of claim 10, further comprising the steps of:
receiving a signal to be transmitted across the transformer; and
amplifying the signal to produce the digital data signal to be input into the transformer's system-side winding.

17. The system of claim 1, wherein the line-side interface circuit is adapted to (i) convert the digital data signal to an analog signal and (ii) transmit the analog signal via a telephone line.

18. The method of claim 10, further comprising the steps of:
converting the buffered and transformed digital data signal to an analog signal; and
transmitting the analog signal via a telephone line.

* * * * *